United States Patent Office 3,806,515
Patented Apr. 23, 1974

3,806,515
CERTAIN 2-ALKYL-3-PHENYL-5,6-DIHYDRO-IMIDAZO[2,1-b]THIAZOLES
William J. Houlihan, 1 Lambrechtgasse, 2500 Baden, Austria, and Robert E. Manning, 30 Laurel Hill Road, Mountain Lakes, N.J. 07046
No Drawing. Continuation-in-part of application Ser. No. 5,894, Jan. 26, 1970, now Patent No. 3,671,533, which is a continuation-in-part of abandoned application Ser. No. 790,449, Jan. 10, 1969, which in turn is a continuation-in-part of abandoned application Ser. No. 748,929, July 31, 1968. This application Apr. 5, 1972, Ser. No. 241,411
Int. Cl. C07d 99/10
U.S. Cl. 260—306.7                8 Claims

ABSTRACT OF THE DISCLOSURE

Substituted imidazo thiazoles, e.g., 3-(4'-chlorophenyl)-2 - ethyl - 3 - hydroxy - 5,6 - dihydroimidazo[2,1-b] thiazole are prepared from 2-haloalkylphenones and 2-imidazolinethione and are useful as anorexics and antidepressants.

---

This application is a continuation-in-part of U.S. application Ser. No. 5,894, filed Jan. 26, 1970, which issued as U.S. Pat. 3,671,533 on June 20, 1972 which in turn is a continuation-in-part of application Ser. No. 790,449, filed Jan. 10, 1969, now abandoned, which in turn was a continuation-in-part of application Ser. No. 748,929, filed July 31, 1968, now abandoned.

This invention relates to novel heterocyclic compounds. More specifically it relates to novel 2-alkyl-3-substituted phenyl - 5,6 - dihydroimidazo thiazoles, intermediates therefor, acid addition salts thereof, and processes for their preparation.

The thiazoles of the present invention may be represented by the formula

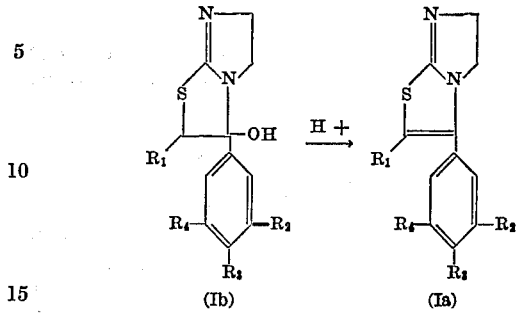

where $R_1$ represents straight chain lower alkyl, i.e., straight chain alkyl having 1 to 4 carbon atoms such as methyl, ethyl and propyl;
$R_2$, $R_3$ and $R_4$ each independently represents hydrogen or halogen having an atomic weight of about 19 to 36;
A is H, and
B is OH or A and B together represent a carbon to carbon double bond, provided at least one of $R_2$, $R_3$ and $R_4$ is other than hydrogen.
Preferred aspects of this invention are those wherein $R_1$ represents methyl or ethyl, $R_3$ represents chloro, $R_2$ and $R_4$ represents H, A is H and B represents OH.

The process for preparing compounds of Formula I where A and B represent a carbon to carbon bond may be represented as follows:

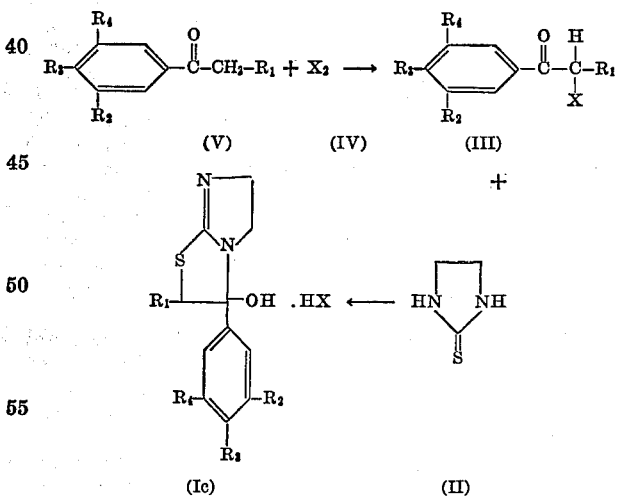

where $R_1$, $R_2$, $R_3$ and $R_4$ have the above stated significance.

The thiazoles of Formula Ia are prepared from the compounds of Formula Ib or an acid addition salt thereof by treatment with an acid such as hydrochloric acid, hydrobromic acid or acetic acid (preferably acetic acid) at a temperature from about room temperature to about the reflux temperature of the system, preferably 50° C. to the reflux temperature. The reaction is normally carried out in excess acid, but a solvent may be used and the particular solvent utilized is not considered critical. Solvents which may be used are lower alkanols such as ethanol, isopropanol and the like, acetone, tetrahydrofuran, or similar inert solvents.

When the compounds of Formula Ia are in the form of acid addition salts, they may be converted to the free base by conventional methods such as suspending the salt form in water and adding sodium carbonate.

The 3 - hydroxy imidazo[2,1-b]thiazoles of Formula Ib may be prepared in acid addition salt form Ic in accordance with the following reaction scheme:

where $R_1$, $R_2$, $R_3$ and $R_4$ have the above stated significance and X is Br or Cl.

The 3-hydroxy imidazo[2,1-b]thiazoles of Formula Ic are prepared by halogenating an alkyl phenyl ketone (V), e.g., 4'-chlorobutyrophenone, with bromine or chlorine (IV) in an inert solvent such as chloroform, carbon tetrachloride, methylenechloride or the like, at a temperature of 0°–50° C. (preferably 20°–35° C.) for about 1 to 8 hours. The resulting 2-haloalkylphenone (III) is treated with 2-imidazolinethione (II) in an inert solvent such as acetone or lower alkanols having 1 to 5 carbon atoms, e.g., methanol, ethanol or isopropanol, at a temperature of 20°–50° C. (preferably 25°–35° C.) for about 3 to 48 hours, to give the desired hydroxy compounds. Standard techniques may be used to recover the hydroxy imidazo [2,1-b]thiazoles.

When the salts of Formula Ic above are recovered and it is desired to convert such salts to the corresponding free bases, conventional techniques may be utilized, e.g., dissolution of the salt in water and precipitation using a base such as sodium hydroxide.

The compounds of Formula Ib may also be illustrated by their tautomeric equivalents such as represented by the following structural formula

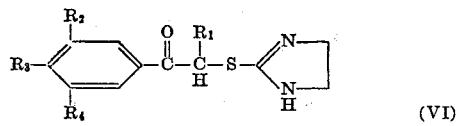

(VI)

where $R_1$, $R_2$, $R_3$ and $R_4$ have the above-stated significance, and it should be appreciated that these tautomers can exist in equilibrium. The predominant tautomer is believed to depend on such factors as whether the compound is a solid or in solution, and the pH and polarity of the environment. In order to simplify this description, however, Formula Ib only will be used, although both tautomeric forms are considered to be within the concept of the present invention.

It is further recognized that the compounds of Formula Ib exist as geometric and optical isomers, the separation and recovery of which may be accomplished employing conventional techniques. All of these isomers (geometric and optical) are included within the scope of this invention.

Certain of the compounds of Formula V are known and are prepared by methods disclosed in the literature. Those not specifically disclosed are prepared from known materials using analogous methods.

The compounds of Formula Ia and Ib are useful because they possess pharmacological activity in animals. More particularly, the compounds possess CNS stimulant activity and are useful as anti-depressants as indicated by their activity in the mouse given parenterally 0.4–25.6 mg./kg. of body weight of active material. The test method used is basically as described by Spencer, P.S.J., Antagonism of Hypothermia in the Mouse by Anti-depressants, in Anti-depressant Drugs, pp. 194–204, Eds. S. Garattini and M. N. G. Dukes, Excerpta Medica Foundation, 1967.

The compounds of Formulas Ia and Ib are also useful as anorexics as indicated by their activity in rat given 10 to 50 mg./kg. of active material and tested by use of the free feeding method described by Randall et al. (J.P.E.T., 129, 163, 1960) whereby 16 groups of six male Wistar rats are deprived of food for 18 hours but receive water ad libitum. Consumption of ground food is then measured over a four hour period following oral administration of the active compound.

Additionally, the compounds of Formula Ib are useful as diuretics as indicated by their activity in unanesthetized en 6.25–50 mg./kg. and tested using basically the described by R. Aston (Toxicol, and Appl. Phar-
77, 1959).

usage, Compounds Ia and Ib may be administered parenterally as such or admixed with pharmaceutical carriers. They may be administered in such forms as tablets, dispersible powders, oral suspensions, syrups and elixirs, solutions, suspensions, dispersions, e.g., a sterile injectable aqueous solutions for oral use may contain adjuvants, such as sweetening ing agents and preserving egant and palatable preparations active ingredient in admixture ceutically acceptable calcium carbonate, nulating and disintegrating agents, e.g., starch, gelatin and acacia, and lubricating agents, e.g., magnesium stearate, stearic acid and talc. The tablets may be uncoated or coated by known techniques to delay disintegration and absorption in the gastrointestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art and may contain appropriate dispersing or wetting agents and suspending agents identical or similar to those mentioned above. These pharmaceutical preparations may contain up to about 90% of the active ingredient in combination with the carrier or adjuvant.

These compounds of Formulas Ia and Ib may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the maleate, fumarate, tartrate, citrate, succinate, benzoate, acetate, p- toluenesulfonate, benzenesulfonate and the like.

In general, satisfactory results for anorexic or antidepressant activity are obtained when the compounds are administered at a daily dosage of from about 0.1 to 50 milligrams per kilogram of animal body weight. This daily dosage is preferably given in divided doses, e.g., 2 to 4 times a day, or in sustained release form. For most large animals, the total daily dosage is from about 6 to 300 milligrams and dosage forms suitable for internal administration comprise from about 1.5 to 150 milligrams of the compound in admixture with a solid or liquid pharmaceutical carrier or diluent.

For the diuretic use, the Compounds Ib may be administered at a daily dosage of from about 1–5 milligrams per kilogram of animal body weight, preferably given 2–4 times a day or in sustained release form. For most large animals, the total daily dosage is from about 50–500 milligrams, and dosage forms suitable for internal administration comprise from about 12.5–250 milligrams of Compound Ib in admixture with a solid or liquid pharmaceutical carrier or diluent.

Tablets and capsules suitable for oral administration

Tablets and capsules containing the ingredients indicated below may be prepared by conventional techniques and are useful in treating depression at a dose of one tablet or capsule 2 to 4 times a day.

| Ingredient | Weight (mg.) | |
| --- | --- | --- |
| | Tablet | Capsule |
| 3-(4-chlorophenyl)-2-ethyl-3-hydroxy-2,3,5,6-tetrahydroimidazo [2,1-b] thiazole | 10 | 10 |
| Tragacanth | 10 | |
| Lactose | 237.5 | 290 |
| Cornstarch | 25 | |
| Talcum | 15 | |
| Magnesium stearate | 2.5 | |
| Total | 300 | 300 |

Sterile suspension for injection and oral liquid suspension

The following pharmaceutical compositions are formulated with the indicated amount of active agent using conventional techniques. The injectable suspension and the oral liquid suspension represent formulations useful as unit doses and may be administered in the treatment of depression. The injectable suspension is suitable for administration once a day whereas the oral liquid suspension is suitably administered 2 to 4 times per day for this purpose.

| Ingredients | Weight (mg.) | |
|---|---|---|
| | Sterile injectable suspension | Oral liquid suspension |
| 3-(4-chlorophenyl)-2-ethyl-3-hydroxy-2,3,5,6-tetrahydroimidazo[2,1-b] thiazole | 25 | 25 |
| Sodium carboxy methyl cellulose, U.S.P | 1.25 | 12.5 |
| Methyl cellulose | 0.4 | |
| Polyvinylpyrrolidone | 5 | |
| Lecithin | 3 | |
| Benzyl alcohol | 0.01 | |
| Magnesium aluminum silicate | | 47.5 |
| Flavor | | Q.s. |
| Color | | Q.s. |
| Methyl paraben, U.S.P | | 4.5 |
| Propyl paraben, U.S.P | | 1.0 |
| Polysorbate 80 (e.g. Tween 80), U.S.P | | 5 |
| Sorbitol solution, 70% U.S.P | | 2,500 |
| Buffer agent to adjust pH for desired stability | Q.S. | Q.S. |
| Water | (¹) | (²) |

¹ For injection, q.s. to 1 ml.
² Q.s. to 5 ml.

EXAMPLE 1

3-(4'-chlorophenyl)-2-ethyl-3-hydroxy-2,3,5,6-tetrahydroimidazo[2,1-b]thiazole hydrobromide

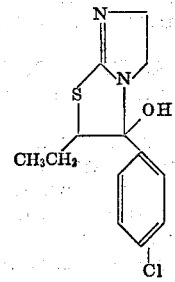

A flask (equipped with a stirrer and dropping funnel) is charged with 54 g. (0.30 mole) of 4'-chlorobutyrophenone and 250 ml. of chloroform. The solution is stirred and a solution of 48.0 g. (16.0 ml., 0.3 mole) of bromine and 250 ml. of chloroform is added dropwise at a rate such that the internal flask temperature does not exceed 35° C. The resulting solution is stirred for one hour and the solvent removed in vacuo. The residue is dissolved in 150 ml. of isopropanol and added in one portion to a slurry of 30.6 g. (0.30 mole) of 2-imidazolinethione and 500 ml. of isopropanol. The reaction is exothermic and a solution results. In about one hour a solid comes out of solution. Stirring is continued for 24 hours at room temperature at which time the resultant solid is filtered off to give 3-(4'-chlorophenyl)-2-ethyl-3-hydroxy-2,3,5,6-tetrahydroimidazo[2,1-b]thiazole hydrobromide; M.P. 280°–283° C.

This compound has been found to have lipolytic activity and may be used to treat obesity or as a weight reducing agent as indicated by its activity in rats given 10–37.5 mg./kg. of compound and tested as indicated by Dole et al. (J. Biol. Chem. 235; 2595, 1960). This compound produces satisfactory results for this use when administered at a daily dosage of from about 0.5–37.5 mg./kg. of animal body weight. For large animals, dosages of 15–150 mg./day are satisfactory and dosage forms may contain about 3.75–75 milligrams of the compound in conjunction with pharmaceutical carrier.

EXAMPLE 2

3-(4'-chlorophenyl)-2-ethyl-5,6-dihydroimidazo [2,1-b]thiazole hydrobromide

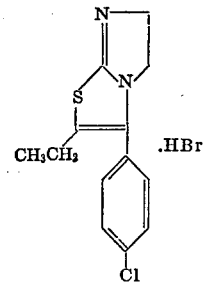

A mixture of 30 g. of 3-(4'-chlorophenyl)-2-ethyl-3-hydroxy-2,3,5,6-tetrahydroimidazo[2,1-b]thiazole hydrobromide and 250 ml. acetic acid is refluxed for 15 hours. The solvent is then removed in vacuo and the residue is stirred with 100 ml. of isopropanol. The solid is filtered off to give 3-(4'-chlorophenyl)-2-ethyl-5,6-dihydroimidazo[2,1-b]thiazole hydrobromide; M.P. 281°–284° C.

EXAMPLE 3

3-(4'-chlorophenyl)-3-hydroxy-2-methyl-2,3,5,6-tetrahydroimidazo[2,1-b]thiazole hydrobromide

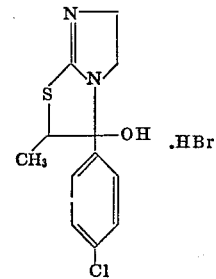

A flask (equipped with a stirrer and dropping funnel) is charged with 54 g. (0.30 mole) of 4'-chloropropiophenone and 250 ml. of chloroform. The solution is stirred and a solution of 48.0 g. (16.0 ml., 0.3 mole) of bromine and 250 ml. of chloroform is added (dropwise) at a rate such that the internal flask temperature does not exceed 35° C. The resulting solution is stirred for one hour and the solvent removed in vacuo. The residue is dissolved in 150 ml. of isopropanol and added in one portion to a slurry of 30.6 g. (0.30 mole) 2-imidazolinethione and 500 ml. of isopropanol. The reaction is exothermic and a solution results. In about one hour a solid comes out of solution. Stirring is continued for 24 hours at room temperature at which time the resultant solid is filtered off to give 3-(4'-chlorophenyl) - 3 - hydroxy-2-methyl-2,3,5,6-tetrahydroimidazo[2,1 - b]thiazole hydrobromide; M.P. 171°–172° C.

This compound also has lipolytic activity and may be used to treat obesity at the same dosage levels as the compound of Example 1.

When the above process is carried out and 4'-fluorobutyrophenone, 3',4' - dichlorobutyrophenone, 3'-chlorobutyrophenone, 4'-chlorovalerophenone, or 4'-chlorohexanophenone is used in place of 4'-chloropropiophenone, there is obtained 2-ethyl-3-(4'-fluorophenyl)-3-hydroxy-2,3,5,6-tetrahydroimidazo[2,1-b]thiazole hydrobromide (M.P. 165°–166° C.), 3-(3',4'-dichlorophenyl)-2-ethyl-3-hydroxy-2,3,5,6-tetrahydroimidazo[2,1-b]thiazole hydrobromide (M.P. 177°–178° C.), 3-(3'-chlorophenyl)-2-ethyl-3-hydroxy-2,3,5,6-tetrahydroimidazo[2,1-b]thiazole hydrobromide (M.P. 179°–180° C.), 3-(4'-chlorophenyl)-3-hydroxy-2-n-propyl-2,3,5,6-tetrahydroimidazo[2,1-b]thiazole hydrobromide (M.P. 253°–255° C.), or 2-n-butyl-3-(4'-chlorophenyl)-3-hydroxy-2,3,5,6-tetrahydroimidazo[2,1-b]thiazole hydrobromide (M.P. 157°–158° C.), respectively.

EXAMPLE 4

3-(4'-chlorophenyl)-2-methyl-5,6-dihydroimidazo[2,1-b]thiazole hydrobroimide

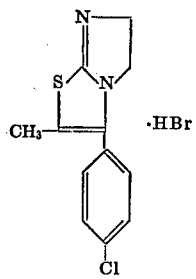

A mixture of 30 g. of 3 - (4' - chlorophenyl)-3-hydroxy - 2 - methyl - 2,3,5,6 - tetrahydroimidazo[2,1-b]thiazole hydrobromide and 250 ml. acetic acid is refluxed for 15 hours. The solvent is then removed in vacuo and the residue is stirred with 100 ml. of isopropanol. The solid is filtered off to give 3 - (4' - chlorophenyl)-2-methyl-5,6 - dihydroimidazo[2,1-b]thiazole hydrobromide; M.P. 289°–290° C.

When the above procedure is carried out and each of the products set out in the last paragraph of Example 3 is used in place of 3 - (4' - chlorophenyl) - 3 - hydroxy-2-methyl-2,3,5,6 - tetrahydroimidazo[2,1-b]thiazole hydrobromide, there is obtained 2-ethyl-3-(4'-fluorophenyl)-5,6-dihydroimidazo[2,1-b]thiazole hydrobromide (M.P. 262°–263° C.), 3-(3',4'-dichlorophenyl)-2-ethyl-5,6-dihydroimidazo-[2,1-b]thiazole hydrobromide (M.P. 255°–257° C.), 3-(3'-chlorophenyl)-2-ethyl-5,6-dihydroimidazo[2,1-b]thiazole hydrobromide (M.P. 239°–241° C.), 3-(4'-chlorophenyl)-2-n-propyl-5,6-dihydroimidazo-[2,1-b]thiazole hydrobromide (M.P. 253°–255° C.), or 2-n-butyl-3-(4'-chlorophenyl)-5,6-dihydroimidazo[2,1-b]thiazole hydrobromide (M.P. 195° C.), respectively.

EXAMPLE 5

3-(4'-chlorophenyl)-2-ethyl-3-hydroxy-2,3,5,6-tetrahydroimidazo[2,1-b]thiazole

A solution of 45 g. of 3-(4'-chlorophenyl)-2-ethyl-3-hydroxy - 2,3,5,6 - tetrahydroimidazo[2,1-b]thiazole hydrobromide in 250 ml. of water is added to a stirred and ice cooled solution of 20 g. of sodium hydroxide in 250 ml. of water. After 1.5 hours stirring the resultant solid is filtered off to give 3-(4'-chlorophenyl)-2-ethyl-3-hydroxy-2,3,5,6 - tetrahydroimidazo[2,1-b]thiazole; M.P. 165°–166° C.

EXAMPLE 6

3-(4'-chlorophenyl)-2-ethyl-3-hydroxy-2,3,5,6-tetrahydroimidazo[2,1-b]thiazole maleate To a stirred solution of 5.8 g. (0.05 mole) of maleic acid in 100 ml. of methanol there is added dropwise in 0.3 hour a solution of 14.1 g. (0.05 mole) of 3-(4'-chlorophenyl) - 2 - ethyl - 3-hydroxy-2,3,5,6-tetrahydroimidazo-[2,1-b]thiazole in 400 ml. of methanol. After stirring one hour the solution is concentrated in vacuo to about ⅓ of the original volume, treated with 300 ml. of diethyl ether and then cooled in an ice bath to obtain 3-(4'-chlorophenyl) - 2 - ethyl - 3 - hydroxy - 2,3,5,6 - tetrahydroimidazo[2,1-b]thiazole maleate; M.P. 89°–92° C.

When the above process is carried out and fumaric acid, tartaric acid, hydrochloric acid or citric acid is used in place of maleic acid, the corresponding fumarate (M.P. 270°–272° C.); tartrate (M.P. 128°–130° C.), hydrochloride (M.P. 270°–272° C.) or citrate (M.P. 146°–147° C.) respectively, is obtained.

What is claimed is:
1. A compound of the formula

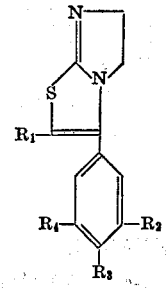

where $R_1$ represents straight chain lower alkyl and
$R_2$, $R_3$ and $R_4$ each independently represents hydrogen, fluoro or chloro, provided at least one of $R_2$, $R_3$ and $R_4$ is other than hydrogen, or a pharmaceutically acceptable acid addition salt thereof.

2. The compound of claim 1 which is 3-(4'-chlorophenyl)-2-ethyl-5,6-dihydroimidazo[2,1-b]thiazole.

3. The compound of claim 1 which is 3-(4'-chlorophenyl) - 2 - methyl - 5,6 - dihydroimidazo[2,1-b]thiazole.

4. The compound of claim 1 which is 2 - ethyl - 3 - (4'-fluorophenyl) - 5,6 - dihydroimidazo[2,1-b]thiazole.

5. The compound of claim 1 which is 3 - (3',4' - dichlorophenyl) - 2 - ethyl - 5,6-dihydroimidazo[2,1-b]thiazole.

6. The compound of claim 1 which is 3 - (3' - chlorophenyl) - 2 - ethyl - 5,6 - dihydroimidazo[2,1-b]thiazole.

7. The compound of claim 1 which is 3-(4' - chlorophenyl) - 2 - n - propyl - 5,6 - dihydroimidazo[2,1-b]thiazole.

8. The compound of claim 1 which is 2-n-butyl-3-(4' - chlorophenyl) - 5,6 - dihydroimidazo[2,1-b]thiazole.

References Cited
UNITED STATES PATENTS 3,671,533  6/1972  Houlihan et al. _____ 260—306.7

RICHARD J. GALLAGHER, Primary Examiner

U.S. Cl. X.R.

260—309.6; 424—80, 270